United States Patent [19]

Grozhan et al.

[11] 3,867,430

[45] Feb. 18, 1975

[54] METHOD OF PRODUCING ALKANOIC ACID ESTERS OF ALPHA-PHENYLETHYL ALCOHOL

[76] Inventors: Mark Markovich Grozhan, Prospekt, 31, Kv. 49; Vladimir Vasilievich Kamzolkin, Ulitsa Vavilova, 55, Kv. 25; Jury Anatolievich Lapitsky, Prospekt, 83, Kv. 226; Andrei Nikolaevich Bashkirov, Ulitsa, 21, Korpus 1, Kv. 13, all of Moscow, U.S.S.R.

[22] Filed: June 28, 1971

[21] Appl. No.: 157,620

[30] Foreign Application Priority Data
July 9, 1970  U.S.S.R............................ 1454037

[52] U.S. Cl. .......... 260/488 CD, 260/592, 260/599, 260/618 R
[51] Int. Cl. ....................... C07c 69/02, C07c 69/14
[58] Field of Search ...... 260/618 R, 618 C, 488 CD

[56] References Cited
UNITED STATES PATENTS
2,485,125   10/1949   Wilkinson ................... 260/618 R X
2,867,666   1/1959    Erickson et al. ............ 260/618 C X

*Primary Examiner*—Leon Zitver
*Assistant Examiner*—Norman Morgenstern
*Attorney, Agent, or Firm*—Holman & Stern

[57] ABSTRACT

A method of producing α-phenylethyl alcohol comprising a liquid-phase oxidation of ethylbenzene with molecular oxygen at a temperature of from 100° to 300°C under a pressure of from 1 to 100 atm. gauge in the presence of a carboxylic acid anhydride taken at a molar ratio of 1:1–12 relative to the ethyl-benzene. The resulting ester of α-phenylethyl alcohol and of a carboxylic acid is subjected to water hydrolysis into the desired product. The method of the invention is highly efficient and makes it possible to produce α-phenylethyl alcohol with a high yield and of a high purity.

3 Claims, No Drawings

METHOD OF PRODUCING ALKANOIC ACID ESTERS OF ALPHA-PHENYLETHYL ALCOHOL

The present invention relates to a method of producing α-phenylethyl alcohol which is widely used in perfumery and as a starting material for the production of styrene.

Known in the art is a method of producing α-phenylethyl alcohol by a liquid-phase oxidation of ethylbenzene with molecular oxygen, followed by catalytic hydrogenation of the resulting acetophenone on a copper-chromium catalyst (see, for instance, British Patent No. 587,181).

The prior art method has a disadvantage residing in its low efficiency.

It is an object of the present invention to provide a highly efficient method of producing α-phenylethyl alcohol.

Another object of the present invention is to provide such a method which makes it possible to produce the desired product with a high yield and of a high purity.

In accordance with these and other objects the invention comprises a liquid-phase oxidizing of ethylbenzene with molecular oxygen at a temperature of from 100° to 300°C under a pressure of from 1 to 100 atm. gauge in the presence of a carboxylic acid anhydride which is used at a molar ratio of 1:1–12 relative to the ethylbenzene, followed by water hydrolysis of the resulting ester of α-phenylethyl alcohol and said carboxylic acid.

The mechanism of the process may be assumed to be as follows: on reacting ethylbenzene with oxygen a hydroperoxide is formed first and this is readily decomposed under the oxidation conditions to yield predominantly an alcohol. A carboxylic acid anhydride which is present in the system reacts with the alcohol to yield an ester whereby the alcohol is prevented from further oxidation. On completion of the reaction said ester is converted to the desired product by water hydrolysis.

According to the method of the present invention it is preferred that the oxidation of ethylbenzene be effected in the presence of acetic anhydride.

It is advisable to effect the oxidation of ethylbenzene at a temperature of from 160° to 200°C and under a pressure of from 15 to 25 atm. gauge.

The method in accordance with the invention is highly efficient and makes it possible to produce α-phenylethyl alcohol with a high yield and of a high purity.

According to the present invention the method of producing α-phenylethyl alcohol may be embodied as follows.

A mixture of ethylbenzene and a carboxylic acid anhydride is charged into a stainless steel reactor. The reaction mass is heated under pressure up to the predetermined temperature. Thereafter an oxidizing gas is introduced into the reactor. The product resulting from such oxidation is subjected to rectification.

Unreacted hydrocarbon and esterifying agent (anhydride) are recycled, oxidation by-products (mainly acetophenone) are removed from the process whereas the ester of α-phenylethyl alcohol and of a carboxylic acid is subjected to water hydrolysis to yield α-phenylethyl alcohol.

The method of producing α-phenylethyl alcohol according to the present invention is further illustrated by the following examples of its embodiment.

EXAMPLE 1

870 g of ethylbenzene and 300 g of acetic anhydride were charged into a reactor. Oxidation of the starting hydrocarbon was effected at a temperature of 160°C and under a pressure of 15 atm. gauge by way of introducing a nitrogen-oxygen mixture (oxygen content of the mixture is 5% by volume) at the rate of 600 l/hour. Within 25 minutes the conversion level of the ethylbenzene reached 9%.

On treating 100 g of ethylbenzene under the above-mentioned conditions there was obtained:

| | (grams) |
|---|---|
| α-phenylethyl alcohol (after hydrolysis of the acetate by boiling with water) | 57 (52% of the theoretical value) |
| acetophenone | 33 |
| benzaldehyde | 2 |

EXAMPLE 2

870 g of ethylbenzene and 300 g of acetic anhydride were charged into a reactor. Oxidation of the ethylbenzene was effected at a temperature of 200°C and under a pressure of 20 atm. gauge by way of introducing a nitrogen-oxygen mixture (oxygen content of the mixture is 10% by volume) at the rate of 600 l/hour. Within 12 minutes the conversion level of the ethylbenzene reached 11%.

On treating 10 g of ethylbenzene under the above-mentioned conditions there was obtained (grams):

| | |
|---|---|
| α-phenylethyl alcohol (after hydrolysis of the acetate by boiling with water) | 65 (60% of the theoretical value) |
| acetophenone | 31 |
| benzaldehyde | 1.5 |

EXAMPLE 3

870 g of ethylbenzene and 300 g of acetic anhydride were charged into a reactor. Oxidation of the starting hydrocarbon was effected at a temperature of 200°C and under a pressure of 25 atm. gauge by introducing a nitrogen-oxygen mixture in a manner described in Example 2. Within 25 minutes the conversion level of the ethylbenzene reached 20%.

On treating 100 g of ethylbenzene under the above-mentioned conditions there was obtained (grams):

| | |
|---|---|
| α-phenylethyl alcohol (after hydrolysis of the acetate by boiling with water) | 57 (51% of the theoretical value) |
| acetophenone | 24 |
| benzaldehyde | 4 |

EXAMPLE 4

600 g of ethylbenzene and 600 g of propionic anhydride were charged into a reactor. Oxidation of the starting hydrocarbon was effected at a temperature of 270°C and under a pressure of 50 atm. gauge by way of introducing air at the rate of 600 l/hour. Within 18 minutes the conversion level reached 18%.

On treating 100 g of ethylbenzene under the above-mentioned conditions there was obtained (grams):

α-phenylethyl alcohol
(after hydrolysis
of the propionate by
boiling with water)    61 (57% of theoretical value)
acetophenone           16
benzaldehyde            6

EXAMPLE 5

1100 g of ethylbenzene and 100 g of acetic anhydride were charged into a reactor. Oxidation of the starting hydrocarbon was effected at a temperature of 120°C and under a pressure of 5 atm. gauge by introducing a nitrogen-oxygen mixture in a manner described in Example 2. Within 12.5 minutes the conversion level of the ethylbenzene reached 7%.

On treating 100 g of ethylbenzene under the above-mentioned conditions there was obtained (grams):

α-phenylethyl alcohol
(after hydrolysis
of the acetate by boiling
with water)            37 (34% of the theoretical value)
acetophenone           60
benzaldehyde            3

What we claim is:

1. A method of producing an alkanoic acid ester of α-phenylethyl alcohol, which comprises effecting a liquid-phase oxidation of ethylbenzene with molecular oxygen at a temperature of 100°–300°C under a pressure of 1–100 atm.g. in the presence of an alkanoic acid anhydride used at a molar ratio to ethylbenzene of 1:1–12 respectively to thereby produce the ester of α-phenylethyl alcohol and of said alkanoic acid.

2. A method as claimed in claim 1, wherein the oxidation of ethylbenzene is effected in the presence of acetic anhydride.

3. A method as claimed in claim 1 wherein the oxidation of ethylbenzene is effected at a temperature of 160° – 200° C under a pressure of 15–25 atm. g.

* * * * *